United States Patent
Wang et al.

(10) Patent No.: US 12,182,516 B2
(45) Date of Patent: Dec. 31, 2024

(54) COMPUTER-IMPLEMENTED METHOD, DEVICE, AND COMPUTER PROGRAM PRODUCT

(71) Applicant: EMC IP Holding Company LLC, Hopkinton, MA (US)

(72) Inventors: Zijia Wang, WeiFang (CN); Jiacheng Ni, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 395 days.

(21) Appl. No.: 17/527,798

(22) Filed: Nov. 16, 2021

(65) Prior Publication Data

US 2023/0127126 A1    Apr. 27, 2023

(30) Foreign Application Priority Data

Oct. 21, 2021  (CN) .......................... 202111229407.8

(51) Int. Cl.
*G06F 17/00* (2019.01)
*G06F 40/30* (2020.01)
*G06N 5/02* (2023.01)

(52) U.S. Cl.
CPC .............. *G06F 40/30* (2020.01); *G06N 5/02* (2013.01)

(58) Field of Classification Search
CPC .................................. G06F 40/30; G06N 5/02
USPC ........................................................... 704/9
See application file for complete search history.

(56) References Cited

U.S. PATENT DOCUMENTS

| | | | |
|---|---|---|---|
| 2016/0292157 A1* | 10/2016 | Zhang | G06Q 50/10 |
| 2019/0251165 A1* | 8/2019 | Bachrach | G06N 3/084 |
| 2020/0151577 A1* | 5/2020 | Ogawa | G06Q 20/4016 |
| 2021/0209177 A1* | 7/2021 | Abdunabi | G06F 9/547 |
| 2021/0232953 A1* | 7/2021 | Hartley | G06F 16/3335 |
| 2023/0123872 A1* | 4/2023 | Paes Leao | G06F 21/6218 726/23 |

OTHER PUBLICATIONS

TFIDF wikipedia page (Year: 2021).*
S. Hochreiter et al., "Long Short-term Memory," Neural Computation, vol. 9, No. 8, 1997, 32 pages.
(Continued)

*Primary Examiner* — Paul C McCord
(74) *Attorney, Agent, or Firm* — Ryan, Mason & Lewis, LLP

(57) ABSTRACT

Embodiments of the present disclosure relate to a computer-implemented method, a device, and a computer program product. The method includes extracting respective themes of a set of documents with release time within a first period; determining respective semantic information of the themes and frequencies of the themes appearing in the set of documents; and determining the number of documents associated with the themes within a second period according to a prediction model and based on the semantic information and frequencies of the themes. The second period is after the first period. Embodiments of the present disclosure can better predict the tendency of the themes appearing in the future based on the semantic information and frequencies of the themes.

20 Claims, 8 Drawing Sheets

(56) References Cited

OTHER PUBLICATIONS

P. Malhotra et al., "Long Short Term Memory Networks for Anomaly Detection in Time Series," European Symposium on Artificial Neural Networks, Computational Intelligence and Machine Learning, Apr. 2015, pp. 89-94.
H. L. Nguyen et al., "Knowledge Graph Fusion for Smart Systems: A Survey," Information Fusion, vol. 61, Mar. 31, 2020, pp. 56-70.

* cited by examiner

FIG. 5

COMPUTER-IMPLEMENTED METHOD, DEVICE, AND COMPUTER PROGRAM PRODUCT

RELATED APPLICATION(S)

The present application claims priority to Chinese Patent Application No. 202111229407.8, filed Oct. 21, 2021, and entitled "Computer-Implemented Method, Device, and Computer Program Product," which is incorporated by reference herein in its entirety.

FIELD

Embodiments of the present disclosure relate generally to the field of computers and specifically to a computer-implemented method, a device, and a computer program product.

BACKGROUND

With the emergence and wide application of various technologies such as big data, Internet of Things, and artificial intelligence, massive amounts of data in different fields are generated. From such massive data, various types of knowledge can be efficiently and transparently obtained and integrated, and the future development direction of science and technology can be predicted. For example, we can predict future interest on various themes, such as popular technological themes, based on the massive data. However, the accuracy of predicting future trends of interest on different themes needs to be further improved.

SUMMARY

Embodiments of the present disclosure provide a computer-implemented method, a device, and a computer program product.

In a first aspect of the present disclosure, a computer-implemented method is provided. The method includes extracting respective themes of a set of documents with release time within a first period; determining respective semantic information of the themes and frequencies of the themes appearing in the set of documents; and determining the number of documents associated with the themes within a second period according to a prediction model and based on the semantic information and frequencies of the themes, wherein the second time period is after the first period.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions including extracting respective themes of a set of documents with release time within a first period; determining respective semantic information of the themes and frequencies of the themes appearing in the set of documents; and determining the number of documents associated with the themes within a second period according to a prediction model and based on the semantic information and frequencies of the themes, wherein the second time period is after the first period.

In a third aspect of the present disclosure, a computer program product is provided. The computer program product is tangibly stored in a non-transitory computer storage medium and includes machine-executable instructions. The machine-executable instructions, when executed by a device, cause the device to execute any step of the method according to the first aspect of the present disclosure.

This Summary is provided to introduce the selection of concepts in a simplified form, which will be further described in the Detailed Description below. The Summary is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent from the following description of example embodiments of the present disclosure, provided in detail with reference to the accompanying drawings, and in the example embodiments of the present disclosure, the same reference numerals generally represent the same components.

FIG. 5 illustrates a schematic diagram of a theme extraction result according to some embodiments of the present disclosure;

Identical or corresponding numerals represent identical or corresponding parts in various accompanying drawings.

DETAILED DESCRIPTION

Figure 1:
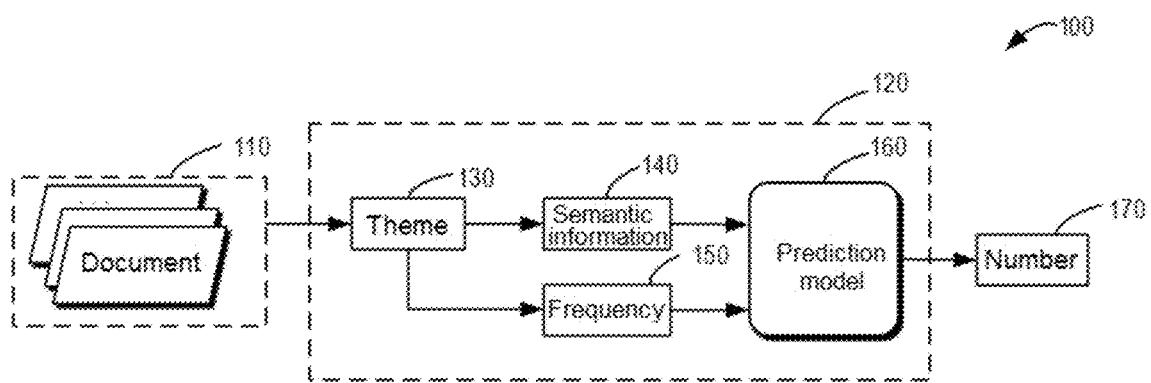
FIG. 1 illustrates a schematic block diagram of an example environment in which some embodiments according to the present disclosure can be implemented.

Example embodiments of the present disclosure will be described in more detail below with reference to the accompanying drawings. Although example embodiments of the present disclosure are illustrated in the accompanying drawings, it should be understood that the present disclosure may be implemented in various forms and should not be limited by the embodiments illustrated herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless otherwise stated, the term "or" means "and/or." The term "based on" denotes "at least partially based on." The terms "an example embodiment" and "an embodiment" denote "at least one example embodiment." The term "another embodiment" means "at least one further embodiment." The terms "first," "second," and the like may refer to different or the same objects. The following may also include other explicit and implicit definitions.

In embodiments of the present disclosure, the term "model" is capable of processing inputs and providing corresponding outputs. A neural network model, for example, typically includes an input layer, an output layer, and one or more hidden layers between the input layer and the output layer. A model used in deep learning applications (also referred to as a "deep learning model") usually includes many hidden layers, thereby increasing the depth of a network. All the layers of a neural network model are connected in sequence, so that an output of the previous layer is provided as an input to a next layer, wherein the input layer receives an input to the neural network model, and an output from the output layer is used as a final output of the neural network model. Each layer of the neural network model includes one or more nodes (also called processing nodes or neurons), each of which processes the input from the previous layer. Herein, the terms "neural network," "model," "network," and "neural network model" can be used interchangeably.

As described above, some solutions have been proposed to predict the future interest on various themes, such as popular technological themes, based on massive data. In some conventional solutions, the frequency that various themes will be followed in a future period of time is usually predicted according to the being-followed frequency of the various themes in the past period of time. For example, through the frequency of a certain theme appearing in papers released in the past period of time, the number of papers related to the theme that will be released in a future period of time is predicted.

However, this conventional theme tendency prediction method only considers the being-followed frequency of the theme in the past period of time, without considering other factors affecting the theme tendency. For example, some themes have certain correlation with each other. It is possible that the future change tendency of a certain theme affects the future change tendency of other themes related to it. This conventional theme tendency prediction method does not consider the mutual influence between such themes. Therefore, the accuracy of theme tendency prediction of this conventional solution is to be further improved.

Embodiments of the present disclosure provide a computer-implemented method to solve one or more of the above problems and/or other potential problems. In this solution, respective themes of a set of documents with release time within a past period of time are extracted. The solution further includes determining respective semantic information of the different themes and frequencies of the themes appearing in the set of documents. The solution further includes determining the number of documents associated with the themes within a future period of time according to a prediction model and based on the semantic information and frequencies of the themes.

In this way, not only can the frequencies of the themes appearing in the past period of time be considered, but also semantic meanings of the themes themselves are further considered. By considering both the frequencies and the semantic meanings, the interest tendency of the themes in the future can be better predicted. Especially the future tendency of a plurality of themes with associated semantic meanings can be better predicted. Thus, the obtained theme future tendency prediction is of higher significance.

The fundamental principles and several example embodiments of the present disclosure will be described in detail below with reference to the accompanying drawings.

FIG. 1 illustrates a schematic diagram of environment 100 for predicting theme future tendency according to some embodiments of the present disclosure. It should be understood that the numbers and arrangement of entities, elements, and modules illustrated in FIG. 1 are examples only, and different numbers and different arrangements of entities, elements, and modules can be included in environment 100.

In environment 100 of FIG. 1, computing system 120 extracts respective themes of a set of documents 110. The issue time or release time of each document in the set of documents 110 is within a first period. For example, the documents in the set of documents 110 may be various types of documents such as journal articles, news reports, and professional books. Computing system 120 may adopt a preset algorithm or a pre-trained theme extraction model or the like to extract the respective themes of the set of documents 110. For example, the respective themes of the set of documents 110 may be extracted by using a model based on computer science ontology (CSO). An example theme extraction process will be introduced in more detail below.

Computing system 120 determines respective semantic information 140 of themes 130 and frequencies 150 of the themes appearing in the set of documents 110. Herein, the frequencies 150 of themes 130 appearing in the set of documents 110 represent the number of documents related to themes 130 in the set of documents 110. Computing system 120 may adopt a preset algorithm or a pre-trained semantic determining model or the like to determine the semantic information 140 of the themes 130. Similarly, computing system 120 may adopt a preset algorithm or a pre-trained frequency determining model or the like to determine the frequencies 150 of the themes 130. An example semantic information determining and frequency determining process will be introduced in more detail below.

As shown in FIG. 1, computing system 120 determines number 170 of documents associated with themes 130 within a second period according to prediction model 160 and based on semantic information 140 and frequencies 150 of themes 130. The second period is a period of time after the first period. For example, the second period is a future period of time. Number 170 can reflect the interest tendency of themes 130 in the future.

Figure 2:
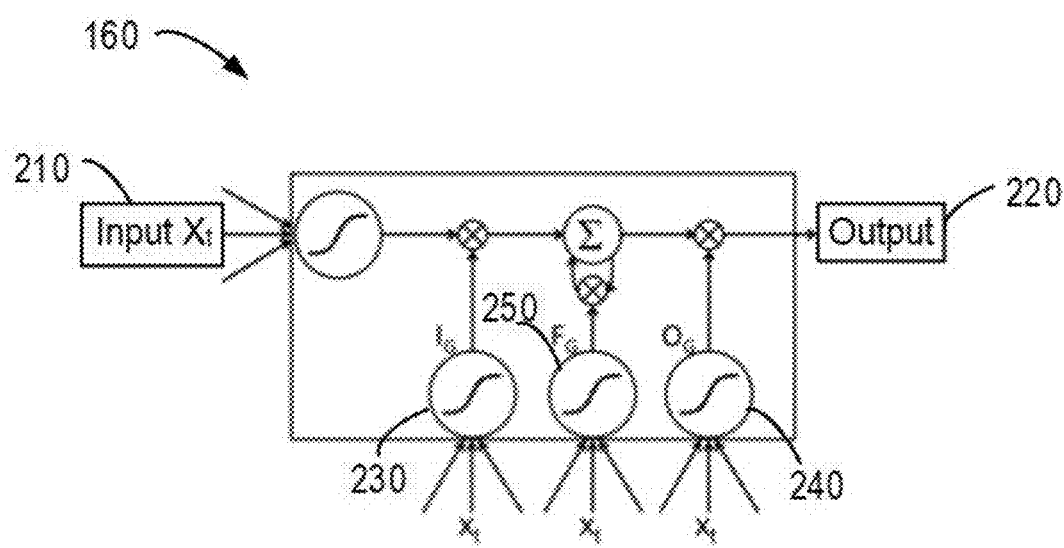
FIG. 2 illustrates a schematic diagram of a prediction model according to some embodiments of the present disclosure.

In some embodiments, prediction model 160 may be a pre-trained neural network model. FIG. 2 illustrates a schematic diagram of example prediction model 160 according to some embodiments of the present disclosure. As shown in FIG. 2, prediction model 160 may be a long-short term memory network LSTM. In the example of FIG. 2, prediction model 160 includes input gate 230, output gate 240, and forgetting gate 250. Input $X_t$ 210 received by prediction model 160 is input to input gate 230, output gate 240, and forgetting gate 250. After, for example, an internal computing logic (i.e., including a plurality of multiplication gates, addition gates, and the like) as shown in FIG. 2, a result corresponding to input $X_t$ 210 may be obtained, that is, output 220. Output 220 may be the predicted number or frequencies corresponding to input $X_t$ 210.

By adopting prediction model 160 such as the LSTM, the vanishing gradient problem occurring in a recurrent neural network (RNN) can be solved. This is implemented by the plurality of multiplication gates inside the LSTM forcedly executing a constant error stream in an internal state of a special unit referred to as "memory unit." By using example prediction model 160 as shown in FIG. 2, memory content may be prevented from being interfered with by irrelevant input and output through input gate 230, output gate 240, and forgetting gate 250, thereby achieving long-term memory storage. In addition, due to long-term correlation capability in this learning sequence of the LSTM, the LSTM does not require a pre-specified time window or accurate modeling on a complex multi-variate sequence. Therefore, by adopting prediction model 160 such as the LSTM, it can better predict the theme tendency.

It should be understood that prediction model 160 may also use other machine learning models. Example prediction model 160 shown in FIG. 2 is only for the purpose of illustration, and the scope of the present disclosure is not limited in this regard.

Example environment 100 according to some embodiments of the present disclosure is described above in combination with FIG. 1. A flow chart of method 300 for theme tendency prediction according to some embodiments of the present disclosure will be described below with reference to FIG. 3. Method 300 can be implemented by computing system 120 of FIG. 1. It should be understood that method 300 may also be executed by other suitable devices or apparatuses. The method 300 may include additional actions not shown and/or may omit actions shown, and the scope of the present disclosure is not limited in this regard. For ease of description, the method 300 will be described with reference to FIG. 1.

Figure 3:
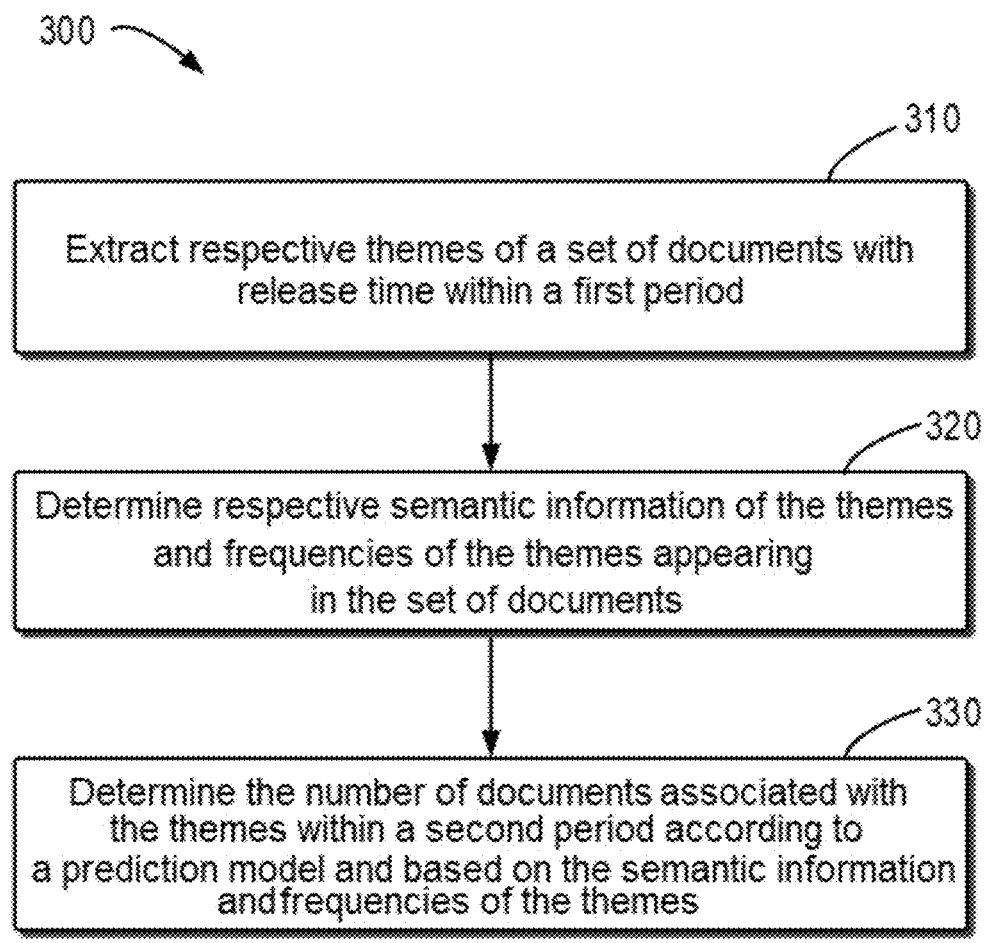
FIG. 3 illustrates a flow chart of an example method for theme tendency prediction according to some embodiments of the present disclosure.

As shown in FIG. 3, at 310, computing system 120 extracts respective themes of the set of documents 110 with release time within a first period. For example, computing system 120 may extract documents with release time within a first period as the set of documents 110 from a certain database (e.g., Springer, CNKI etc.) or other online resources (e.g., Google, etc.). The first period may be a period of time that is, for example, one week, one month, one quarter or other time spans from the current time.

In some embodiments, computing system 120 may extract all the documents with the release time within the first period as the set of documents 110. Additionally or alternatively, computing system 120 may extract a predefined number of documents that are accessed most in all the documents with the release time within the first period as the set of documents 110. The predefined number may be, for example, 1000, 10000, or any other proper number. It should be understood that the set of documents 110 may also be obtained using other methods.

Figure 4:
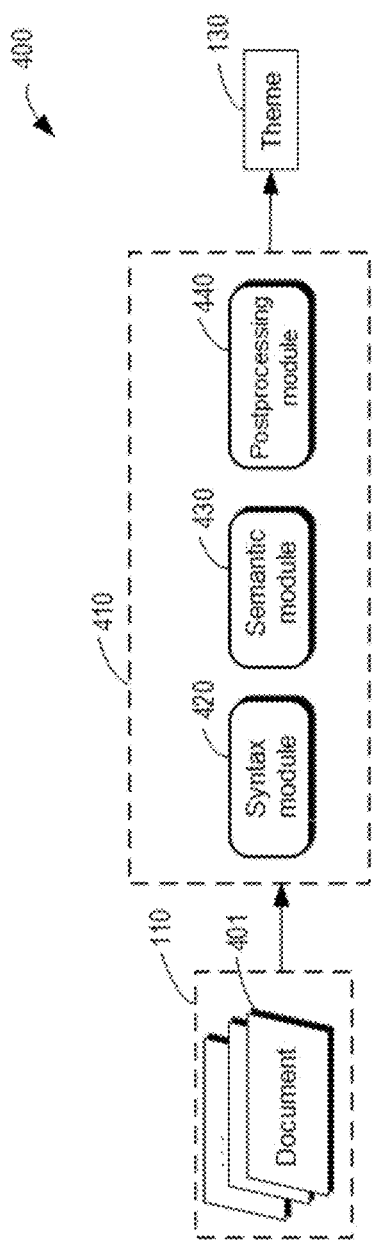
FIG. 4 illustrates an example block diagram of theme extraction according to some embodiments of the present disclosure.

Computing system 120 may use a theme classifying model to extract the respective themes of the set of documents 110. For example, the theme classifying model may be a pre-trained CSO theme classifying model. FIG. 4 illustrates example block diagram 400 of theme extraction using theme classifying model 410 according to some embodiments of the present disclosure.

As shown in FIG. 4, theme classifying model 410 may include syntax module 420, semantic module 430, and postprocessing module 440. Theme classifying model 410 may receive the set of documents 110 and extract the respective themes of the set of documents 110 respectively. A theme extraction process of theme classifying model 410 is described below taking document 401 in the set of documents 110 as an example.

In some embodiments, syntax module 420 may divide content of document 401 into a plurality of segments (N-Grams). In some embodiments, syntax module 420 may divide a title, an abstract, and keywords of document 401 into a plurality of segments. Alternatively, syntax module 420 may also divide other content, such as content of a summary part at the end, of document 401 into a plurality of segments. This solution is not limited in this regard. Syntax module 420 further determines similarities between the segments and the different themes (or concepts).

In some embodiments, semantic module 430 may be a module based on CSO and word marking or embedding. Semantic module 430 may extract entities from the plurality of segments divided from document 401. Herein, the entities may refer to words or phrases associated with a certain theme. For example, the entities may be phrases "image recognition," "three-dimensional (3D) reconstruction," and the like associated with the theme "neural network."

Additionally or alternatively, semantic module 430 may also perform theme identification on the extracted entities. For example, if the extracted entity is "3D reconstruction," semantic module 430 may identify the entity as being associated with "neural network."

In some embodiments, semantic module 430 may sort the identified themes in document 401 according to the number or frequency of identification of the themes. Semantic module 430 may select a predefined number (e.g., 5) of top-ranked themes from the sorting as the themes of document 401. It should be understood that the number 5 listed herein is only an example, and the predefined number may be any proper number.

As shown in FIG. 4, theme classifying model 410 may further include postprocessing module 440. Postprocessing module 440 may combine the segments output by syntax module 420 with the themes output by semantic module 430. For example, postprocessing module 440 may combine the segments with the themes according to the similarities between the segments and the themes determined by syntax module 420. In some embodiments, postprocessing module 440 adopts a form such as a knowledge graph to output the combined segments and themes.

Additionally or alternatively, in some embodiments, postprocessing module 440 is configured to filter output results. For example, postprocessing module 440 may determine the similarity between the predefined number of themes for document 401 output by semantic module 430. If it is determined that the similarity between a certain theme in the predefined number of themes and other themes is lower than a similarity threshold value (e.g., the similarity may be a value between 0 and 1), the theme may be removed.

In some embodiments, postprocessing module 440 may further enhance the output results. For example, if postprocessing module 440 determines that the output themes have a first theme and a second theme which may be included in the first theme and more refined, postprocessing module 440 may remove the first theme from the output results. For example, if postprocessing module 440 determines that the output results include a theme "artificial intelligence" and a theme "recurrent neural network," postprocessing module 440 may only retain the theme "recurrent neural network" and remove the theme "artificial intelligence."

The process of performing theme extraction on document 401 in the set of documents 110 is described above in combination with FIG. 4. It should be understood that theme extraction may also be performed on other documents in the set of documents 110 in a similar way.

By using theme classifying model 410 described in combination with FIG. 4 above, the respective themes of the set of documents can be extracted more accurately. It should be understood that theme classifying model 410 described in FIG. 4 is only for the purpose of illustration, and is not restrictive. Computing system 120 may adopt other proper algorithms or a pre-trained machine learning model or the like to extract the respective themes of the set of documents 110.

Figure 5:
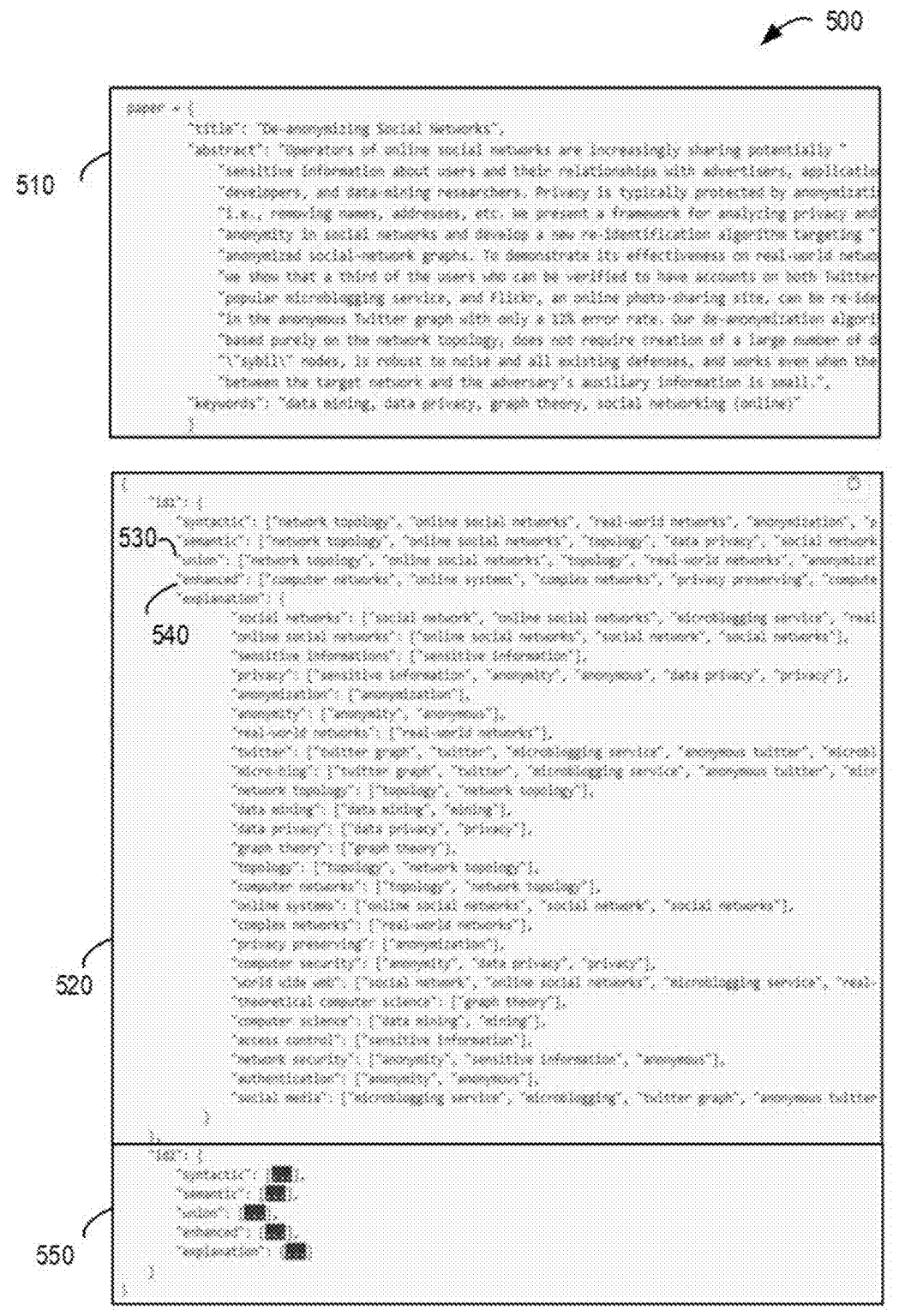

FIG. 5 illustrates a schematic diagram of theme extraction result 500 according to some embodiments of the present disclosure. Theme extraction result 500 shown in FIG. 5 may be obtained by theme classifying model 410 described with reference to FIG. 4. Theme extraction result 500 in FIG. 5 may also be obtained by using other theme extraction methods. As shown in FIG. 5, document information 510 includes document information of an example document in the set of documents 110. Document information 510 includes a title, an abstract, and keywords of the document. It should be understood that computing system 120 may also receive document information of other documents in the set of documents 110.

Example result 520 in FIG. 5 has a plurality of output results. For example, a result included in field "union" 530 includes a theme extracted according to document information 510. A result included in field "enhanced" 540 includes a filtered and enhanced theme obtained from the result included in field "union" 530 through postprocessing module 440.

In the example of FIG. 5, other additional output results are further shown. For example, content included in a field "syntactic" may be a segment obtained by syntax module 420. Content included in a field "semantic" may be a theme identified by semantic module 430. Content included in a field "explanation" may be information obtained by combining the theme and a segment corresponding to the theme. In addition, FIG. 5 further illustrates output result 550 corresponding to another document. Output result 550 is similar to result 520.

It should be understood that theme extraction result 500 shown in FIG. 5 is only an example, and not restrictive. In some embodiments, the output result may only include the themes, excluding other additional information in FIG. 5. In some embodiments, the output result may include more additional information. By adding the other information besides the themes into the output result, more information may be provided for analysis in a subsequent process of presenting results to a user.

Continuing with reference to FIG. 3, at 320, computing system 120 determines respective semantic information 140 of the themes and frequencies 150 of the themes appearing in the set of documents 110. In some embodiments, computing system 120 may determine the respective semantic information and frequency of each theme extracted from each document in the set of documents 110. In some embodiments, computing system 120 may also select some themes (e.g., one or more themes of interest) from the themes extracted from each document in the set of documents 110 to determine the respective semantic information and frequencies of the themes.

In some embodiments, computing system 120 may determine the semantic information of the themes by determining a time sequence of semantic representations of the themes within the first period. For example, the themes at time interval points within the first period may be encoded to the time sequence of semantic representations. Semantic representations at the time interval points in the time sequence of semantic representations are configured to represent semantic meanings of the themes, and may also be regarded as word embedding.

Taking simple statements "Have a good day" and "Have a great day" as an example, the dimension of a word set {"have," "a," "good," "great," "day"} contained in the above two statements is 5. Therefore, each word may be encoded respectively by using vectors of 5 dimensions. For example, the word "have" may be encoded as [1, 0, 0, 0, 0]. The word "a" may be encoded as [0, 1, 0, 0, 0]. The word "good" may be encoded as [0, 0, 1, 0, 0]. The word "great" may be encoded as [0, 0, 0, 1, 0]. The word "day" may be encoded as [0, 0, 0, 0, 1]. The themes at the time interval points within the first period may be encoded in a similar way to obtain the time sequence of semantic representations.

In some embodiments, the time sequence of semantic representations may be determined by adopting a pre-trained semantic encoding model. The pre-trained semantic encoding model may be implemented by using any suitable type of neural network. For example, the pre-trained semantic encoding model may be implemented by using a transformer or a bidirectional encoder representations from transformers (BERT). It should be understood that the semantic encoding model adopted herein may adapt to various languages, such as English, Chinese, etc.

In some embodiments, for the time interval point within the first period, the pre-trained semantic encoding model determines the semantic representation of the time sequence of semantic representations at the time interval point according to the semantic encoding model and based on words or words in phrases corresponding to a certain theme in the document with the release time not later than the time interval point in the set of documents 110.

In some embodiments, a classification token ([cls] token) corresponding to the theme determined by the pre-trained semantic encoding model may be used as the semantic representation of the theme. In this way, the theme with different numbers of words may be represented by a single classification token with the same dimension. In this way, subsequent theme tendency prediction and other tasks can be conveniently performed.

The time interval points within the first period may have the same or different time intervals. For example, taking the first period being a week as an example, the first period may have seven time interval points with one day as an interval. The pre-trained semantic encoding model may determine semantic information of the theme at each time interval point within the period. It should be understood that the span of the first period and the interval of the time interval points listed in the present disclosure are only examples, and not restrictive.

The semantic information of the themes can be accurately extracted by obtaining the semantic representations of the themes through the pre-trained semantic encoding model such as the BERT. In addition, by properly encoding the semantic information, subsequent different tasks such as theme tendency prediction can be conveniently performed.

In some embodiments, computing system 120 may determine the frequencies of the themes by determining a time sequence of frequency representations of the themes within the first period. For example, for a time interval point within the first period, computing system 120 may determine a frequency representation of the time sequence of frequency representations at the time interval point based on the number of documents corresponding to the themes in documents with release time not later than the time interval point in the set of documents 110.

Additionally or alternatively, computing system 120 may also use a position extension code to determine the frequency representation of the time sequence of frequency representations of the themes at the time interval points. The position extension code may be, for example, an extension code of a cosine probability function. An example position code is shown as follows:

$$D_{it} = \begin{cases} PE(t, k) = \sin(t \times \omega_n), & \text{if } k = 2n \\ PE(t, k) = \cos(t \times \omega_n), & \text{if } k = 2n+1 \end{cases} \quad (1)$$

In formula (1), t represents a frequency of a theme, and $D_{it}$ represents a frequency representation of the frequency t, k represents the k-th component of the frequency representation, the frequency representation has a dimension d, and k≤d.

In some embodiments, $\omega_n$ in formula (1) may be represented as follows:

$$\omega_n = \frac{1}{10000^{2n/d}} \quad (2)$$

By adopting the position extension code mode listed above, the one-dimensional frequency of the theme may be extended into a multi-dimensional frequency representation. An example of one frequency representation obtained by the code is shown as formula (3) below:

$$\vec{p_t} = \begin{bmatrix} \sin(\omega_1 \cdot t) \\ \cos(\omega_1 \cdot t) \\ \sin(\omega_2 \cdot t) \\ \cos(\omega_2 \cdot t) \\ \vdots \\ \sin(\omega_{d/2} \cdot t) \\ \cos(\omega_{d/2} \cdot t) \end{bmatrix}_{d \times 1} \quad (3)$$

In some embodiments, the dimension d of the frequency representation may be a preset number greater than 1. For example, if the semantic representation at each time interval point in the time sequence of semantic representations has a dimension of 728, d may be set as 728 dimensions. It should be understood that the number of the dimensions listed above is only an example. It should be understood that d may be set as other dimensions which are the same, or more or less than the dimension of the semantic representation. The frequency representation may adopt the form of the vector shown in (3), for example. The frequency representation may also adopt other data forms. This solution is not limited in this regard.

It should be understood that the position extension code method listed above is only an example, and not restrictive. Other extension code methods may be adopted to extend the one-dimensional frequency into the multi-dimensional frequency representation.

By making the frequency representation of the theme the multi-dimensional frequency representation, the frequency of the theme may be prevented from being ignored when the theme tendency is predicted due to the multi-dimensional semantic representation and the single-dimensional frequency. In this way, the semantic information and frequencies of the themes can be considered more sufficiently, without missing the frequency influence during prediction due to the difference of dimensions.

Continuing with reference to FIG. 3, at 330, computing system 120 determines the number of documents associated with the themes within a second period according to prediction model 160 and based on semantic information 140 and frequencies 150 of the themes. The second period is after the first period. For example, the second period may be a future period of time after current time. For example, the second period may be one week, one month, or one year in the future.

In some embodiments, prediction model 160 may adopt a pre-trained LSTM model, as described with reference to FIG. 2. In some embodiments, prediction model 160 may also use other proper neural network models.

In some embodiments, computing system 120 may determine a number time sequence of the themes within the second period. The number time sequence includes the number of documents associated with the themes at each time interval point within the second period. For example, computing system 120 may determine the number time sequence of the themes within the second period according to prediction model 160 and based on the time sequence of semantic representations and time sequence of frequency representations of the themes.

In some embodiments, computing system 120 may determine the number of documents associated with each theme extracted from the set of documents 110 within the second period. In some embodiments, computing system 120 may only analyze certain themes therein, such as some themes of interest of a user. In other words, computing system 120 may only determine the number of documents associated with one or more themes in the themes extracted from the set of documents 110 within the second period.

In this way, during future tendency prediction of the themes, the frequencies of the themes appearing in the past can be considered, and the semantic information of the themes is also considered. In this way, the theme tendency may be predicted more accurately. Especially for some associated themes, analyzing the semantic meanings of these themes can consider the association between these themes, so that more accurate prediction results are obtained. For example, themes "artificial intelligence" and "machine learning" have similar semantic meanings. The similar predicted tendency of the themes "artificial intelligence" and "machine learning" can be obtained by using theme tendency prediction of this solution. In addition, by predicting the number of the documents associated with the themes within a future period through the method of this solution, the future technology development tendency can be analyzed and predicted.

Figure 6:
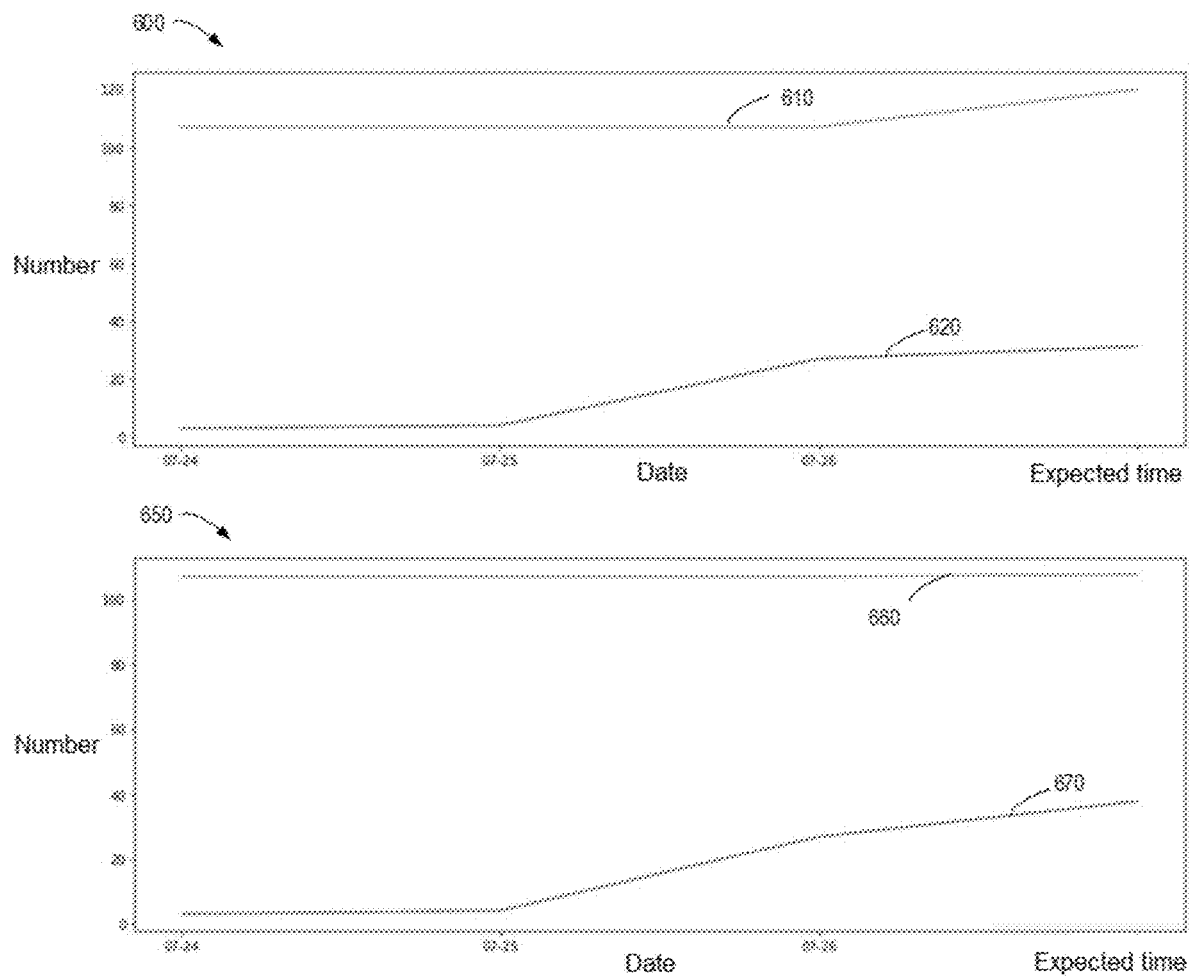
FIG. 6 illustrates a schematic diagram of example output results of theme tendency prediction according to some embodiments of the present disclosure versus output results of a conventional solution.

FIG. 6 illustrates a schematic diagram of example output result 600 of theme tendency prediction according to some embodiments of the present disclosure versus output result 650 of a conventional solution. Example output result 600 in FIG. 6 represents prediction of the number of documents associated with the themes within expected time according to information from July 24, July 25, and July 26 by using the solution of the present disclosure. Example output result 650 represents prediction of the number of documents associated with the themes within the expected time according to the information from July 24, July 25, and July 26 by using the conventional solution.

Result 610 in FIG. 6 represents a result obtained by predicting a theme "point cloud" by using the solution of the present disclosure. Result 620 represents a result obtained by predicting a theme "3D human face reconstruction" by using the solution of the present disclosure. Result 660 represents a result obtained by predicting the theme "point cloud" by using the conventional solution. Result 670 represents a result obtained by predicting the theme "3D human face reconstruction" by using the conventional solution.

The point cloud is a conventional method for processing 3D images. "Point cloud" may not be mentioned in titles, abstracts, keywords, and other key parts in some documents about the theme "3D human face reconstruction." However, it is possible that these documents are actually associated with "point cloud." As shown in FIG. 6, by using the conventional solution, what may only be predicted is that the number of the documents associated with the theme "3D human face reconstruction" is increased, as indicated by prediction result 670. However, prediction result 660 of the conventional solution represents that the number of the documents associated with the theme "point cloud" is not increased.

Compared to this, by using the solution of the present disclosure, it can be considered that the theme "point cloud" and the theme "3D human face reconstruction" have a certain semantic connection. Thus, result 610 and result 620 predict that the number of documents associated with the theme "point cloud" and the number of documents associated with the theme "3D human face reconstruction" are both increased.

It can be seen by comparing output result 600 and output result 650 that the theme prediction result obtained by using the solution of the present disclosure can consider the semantic information of the themes, and therefore the future tendency of the themes can be better predicted.

It should be understood that the results shown in FIG. 6 are only illustrative. FIG. 6 only shows the future tendency prediction of two themes. In some embodiments, fewer or more themes may be predicted. In addition, theme tendency prediction within shorter or longer future time may also be performed by using more or better document information in the past.

Through testing, theme tendency prediction using the conventional solution has a loss rate of about 0.1% in 2000 rounds. Compared to this, theme tendency prediction using the present solution has a loss rate of about 0.0625% in 2000 rounds. The theme tendency prediction using the present solution therefore has better performance in terms of loss rate.

Figure 7:
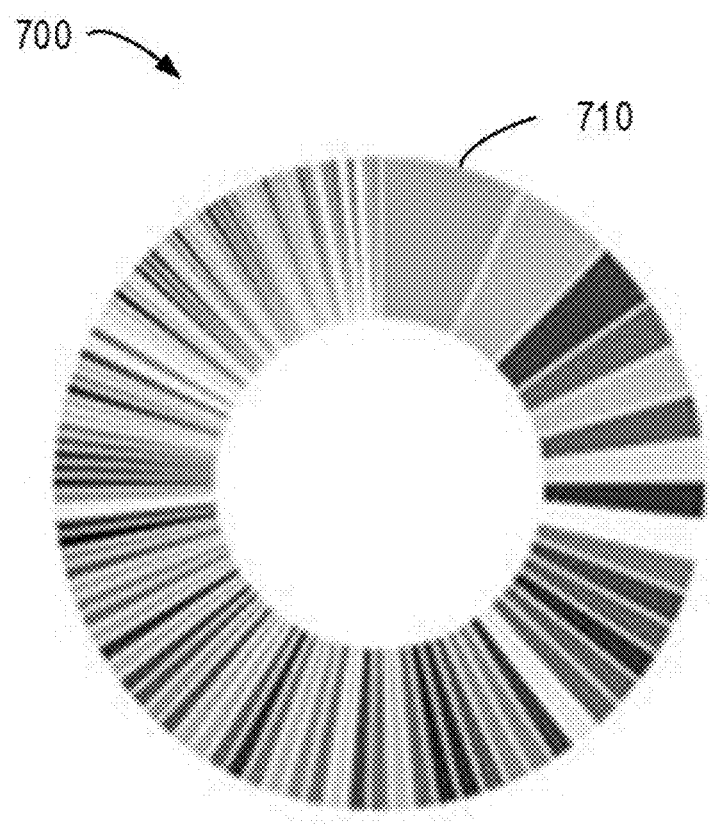
FIG. 7 illustrates a schematic diagram of another output result of theme tendency prediction according to some embodiments of the present disclosure.

FIG. 7 illustrates a schematic diagram of another output result 700 of theme tendency prediction according to some embodiments of the present disclosure. By using the solution of the present disclosure, the interest condition of various different themes at a certain time point may also be predicted. For example, as shown in FIG. 7, different gray blocks may represent different themes. The areas of the different blocks may represent the number of issued documents associated with the themes. For example, block 710 represents that the theme corresponding to that block has the most interest at that time point.

It should be understood that the theme tendency prediction method according to the embodiment of the present disclosure may also provide other prediction information besides that illustrated in FIG. 6 and FIG. 7. By using the present solution, the future science and technology development direction and the like can be predicted and analyzed.

Figure 8:
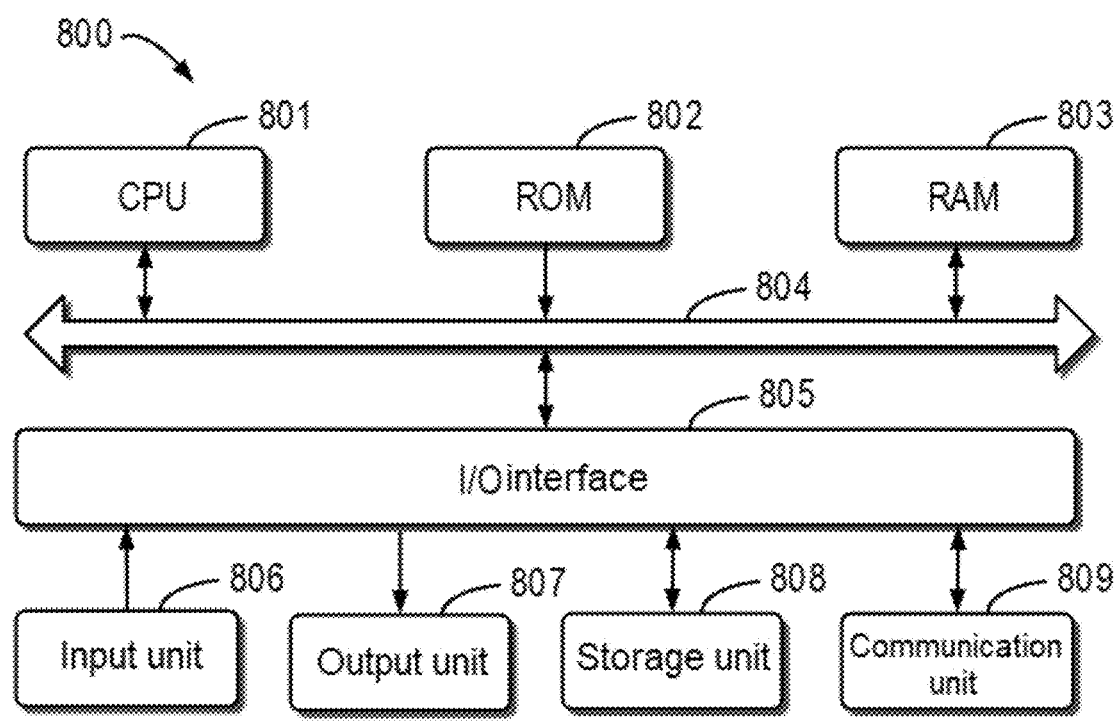
FIG. 8 illustrates a schematic block diagram of an example device for implementing embodiments of the present disclosure.

FIG. 8 shows a schematic block diagram of example device 800 that may be configured to implement embodiments of the present disclosure. For example, computing system 120 as shown in FIG. 1 can be implemented by device 800. As shown in FIG. 8, device 800 includes central processing unit (CPU) 801 that can perform various appropriate actions and processing according to computer program instructions stored in read-only memory (ROM) 802 or computer program instructions loaded from storage unit 808 to random access memory (RAM) 803. Various programs and data required for the operation of device 800 may also be stored in RAM 803. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. In some embodiments, input samples can be input to device 800 via input unit 806. Communication unit 809 allows device 800 to exchange information/data with other devices via a computer network, such as the Internet, and/or various telecommunication networks.

The various processes and processing procedures described above, such as method 300, may be performed by CPU 801. For example, in some embodiments, method 300 may be implemented as a computer software program that is tangibly included in a machine-readable medium such as storage unit 808. In some embodiments, part or all of the computer program may be loaded and/or installed onto device 800 via ROM 802 and/or communication unit 809. When the computer program is loaded into RAM 803 and executed by CPU 801, one or more actions of method 300 described above may be implemented.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires. The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product implemented according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Illustrative embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A computer-implemented method, comprising:
    extracting respective themes of a set of documents with release time within a first period;
    determining respective semantic information of the themes and frequencies of the themes appearing in the set of documents utilizing at least a first machine learning model, the first machine learning model comprising a transformer-based model; and
    determining the number of documents associated with the themes within a second period according to a second machine learning model, different than the first machine learning model, the second machine learning model comprising a time sequence prediction model and based on the semantic information and frequencies of the themes, wherein the second period is after the first period;
    wherein the first machine learning model is configured to encode the semantic information of the themes and the frequencies of the themes appearing in the set of documents;
    wherein results of the encoding of the semantic information of the themes and the frequencies of the themes comprises, for each of at least a subset of the themes, (i) a semantic encoding component comprising at least a classification token for the semantic information of the theme, and (ii) a frequency encoding component comprising a plurality of frequency-related values generated for the frequency of appearance of the theme based on a designated probability function;

wherein the second machine learning model is configured to process the semantic encoding components and the frequency encoding components to determine the number of documents associated with the themes within the second period;

wherein determining the frequencies comprises determining a time sequence of frequency representations of the themes within the first period;

wherein determining the time sequence of frequency representations comprises:

for a time interval point within the first period, determining a frequency representation of the time sequence of frequency representations at the time interval point based on the number of documents corresponding to the themes; and wherein determining the frequency representation at the time interval point comprises:

determining the frequency representation by using a position extending code based on the number of documents corresponding to the themes.

2. The method according to claim 1, wherein determining the semantic information comprises:

determining a time sequence of semantic representations of the themes within the first period.

3. The method according to claim 2, wherein determining the time sequence of semantic representations comprises:

for a time interval point within the first period, determining a semantic representation of the time sequence of semantic representations at the time interval point according to a semantic encoding model and based on words or words in phrases corresponding to the themes in documents with release time not later than the time interval point in the set of documents.

4. The method according to claim 1, wherein determining the frequency representation of the time sequence of frequency representations at the time interval point is based on the number of documents corresponding to the themes in documents with release time not later than the time interval point in the set of documents.

5. The method according to claim 1, wherein the frequency representation has a predefined dimension which is greater than one dimension.

6. The method according to claim 1, wherein extracting the respective themes of the set of documents comprises:

extracting a predefined number of respective themes of the set of documents by using a theme classifying model.

7. The method according to claim 1, wherein determining the number of the documents associated with the themes within the second period comprises:

determining a number time sequence of the themes within the second period, wherein the number time sequence comprises the number of documents associated with the themes at each time interval point within the second period.

8. An electronic device, comprising:

at least one processor; and at least one memory storing computer program instructions, wherein the computer program instructions, when executed by the at least one processor, cause the electronic device to perform actions comprising:

extracting respective themes of a set of documents with release time within a first period;

determining respective semantic information of the themes and frequencies of the themes appearing in the set of documents utilizing at least a first machine learning model, the first machine learning model comprising a transformer-based model; and determining the number of documents associated with the themes within a second period according to a second machine learning model, different than the first machine learning model, the second machine learning model comprising a time sequence prediction model and based on the semantic information and frequencies of the themes, wherein the second period is after the first period;

wherein the first machine learning model is configured to encode the semantic information of the themes and the frequencies of the themes appearing in the set of documents;

wherein results of the encoding of the semantic information of the themes and the frequencies of the themes comprises, for each of at least a subset of the themes, (i) a semantic encoding component comprising at least a classification token for the semantic information of the theme, and (ii) a frequency encoding component comprising a plurality of frequency-related values generated for the frequency of appearance of the theme based on a designated probability function;

wherein the second machine learning model is configured to process the semantic encoding components and the frequency encoding components to determine the number of documents associated with the themes within the second period;

wherein determining the frequencies comprises determining a time sequence of frequency representations of the themes within the first period;

wherein determining the time sequence of frequency representations comprises:

for a time interval point within the first period, determining a frequency representation of the time sequence of frequency representations at the time interval point based on the number of documents corresponding to the themes; and wherein determining the frequency representation at the time interval point comprises:

determining the frequency representation by using a position extending code based on the number of documents corresponding to the themes.

9. The electronic device according to claim 8, wherein determining the semantic information comprises:

determining a time sequence of semantic representations of the themes within the first period.

10. The electronic device according to claim 9, wherein determining the time sequence of semantic representations comprises:

for a time interval point within the first period, determining a semantic representation of the time sequence of semantic representations at the time interval point according to a semantic encoding model and based on words or words in phrases corresponding to the themes in documents with release time not later than the time interval point in the set of documents.

11. The electronic device according to claim 8, wherein determining the frequency representation of the time sequence of frequency representations at the time interval point is based on the number of documents corresponding to the themes in documents with release time not later than the time interval point in the set of documents.

12. The electronic device according to claim 8, wherein the frequency representation has a predefined dimension which is greater than one dimension.

13. The electronic device according to claim 8, wherein extracting the respective themes of the set of documents comprises:

extracting a predefined number of respective themes of the set of documents by using a theme classifying model.

14. The electronic device according to claim 8, wherein determining the number of the documents associated with the themes within the second period comprises:

determining a number time sequence of the themes within the second period, wherein the number time sequence comprises the number of documents associated with the themes at each time interval point within the second period.

15. A computer program product tangibly stored in a non-transitory computer-readable storage medium and including machine-executable instructions, wherein the machine-executable instructions, when executed, cause a device to execute a method, the method comprising:

extracting respective themes of a set of documents with release time within a first period;

determining respective semantic information of the themes and frequencies of the themes appearing in the set of documents utilizing at least a first machine learning model, the first machine learning model comprising a transformer-based model; and determining the number of documents associated with the themes within a second period according to a second machine learning model, different than the first machine learning model, the second machine learning model comprising a time sequence prediction model and based on the semantic information and frequencies of the themes, wherein the second period is after the first period;

wherein the first machine learning model is configured to encode the semantic information of the themes and the frequencies of the themes appearing in the set of documents;

wherein results of the encoding of the semantic information of the themes and the frequencies of the themes comprises, for each of at least a subset of the themes, (i) a semantic encoding component comprising at least a classification token for the semantic information of the theme, and (ii) a frequency encoding component comprising a plurality of frequency-related values generated for the frequency of appearance of the theme based on a designated probability function;

wherein the second machine learning model is configured to process the semantic encoding components and the frequency encoding components to determine the number of documents associated with the themes within the second period;

wherein determining the frequencies comprises determining a time sequence of frequency representations of the themes within the first period;

wherein determining the time sequence of frequency representations comprises:

for a time interval point within the first period, determining a frequency representation of the time sequence of frequency representations at the time interval point based on the number of documents corresponding to the themes; and wherein determining the frequency representation at the time interval point comprises:

determining the frequency representation by using a position extending code based on the number of documents corresponding to the themes.

16. The computer program product according to claim 15, wherein determining the semantic information comprises:

determining a time sequence of semantic representations of the themes within the first period.

17. The computer program product according to claim 16, wherein determining the time sequence of semantic representations comprises:

for a time interval point within the first period, determining a semantic representation of the time sequence of semantic representations at the time interval point according to a semantic encoding model and based on words or words in phrases corresponding to the themes in documents with release time not later than the time interval point in the set of documents.

18. The computer program product according to claim 15, wherein determining the frequency representation of the time sequence of frequency representations at the time interval point is based on the number of documents corresponding to the themes in documents with release time not later than the time interval point in the set of documents.

19. The computer program product according to claim 15, wherein the frequency representation has a predefined dimension which is greater than one dimension.

20. The computer program product according to claim 15, wherein determining the number of the documents associated with the themes within the second period comprises:

determining a number time sequence of the themes within the second period, wherein the number time sequence comprises the number of documents associated with the themes at each time interval point within the second period.

* * * * *